May 9, 1933.  C. W. HOWE  1,908,294
METHOD OF AND APPARATUS FOR PICKING COTTON
Filed Feb. 3, 1930   6 Sheets-Sheet 1

INVENTOR
Charles Warren Howe

May 9, 1933. C. W. HOWE 1,908,294
METHOD OF AND APPARATUS FOR PICKING COTTON
Filed Feb. 3, 1930 6 Sheets-Sheet 3

Fig. 4.

INVENTOR
Charles Warren Howe

May 9, 1933. C. W. HOWE 1,908,294
METHOD OF AND APPARATUS FOR PICKING COTTON
Filed Feb. 3, 1930 6 Sheets-Sheet 4

Fig.5

INVENTOR
Charles Warren Howe

Patented May 9, 1933

1,908,294

UNITED STATES PATENT OFFICE

CHARLES WARREN HOWE, OF LOWELL, MASSACHUSETTS, ASSIGNOR TO SACO-LOWELL SHOPS, OF NEWTON, MASSACHUSETTS, A CORPORATION OF MASSACHUSETTS

METHOD OF AND APPARATUS FOR PICKING COTTON

Application filed February 3, 1930. Serial No. 425,570.

This invention relates to picker systems, to the various units used in such systems, and more especially to the so-called "single process picker systems".

In prior applications assigned to the assignee of the present invention, single process picker systems have been disclosed which, for the first time so far as I have been able to learn, have proved successful commercially under a great variety of mill conditions. These systems take the cotton from the opening machines and produce, in a single continuous process, a finished lap without any break in the operations or any manual handling of the cotton. The commercial system embodying these inventions and which is now being marketed has met with an exceptional degree of success. It has been found, however, in operating these systems that while they are very reliable, still they do require a rather high degree of intelligence on the part of the mill operator, and if the system once gets out of adjustment for any reason considerable skill is required to restore the system to proper adjustment again.

The present invention has for its general object to improve cotton picking systems and the units used in such systems with a view to making such systems and units more reliable, enabling them to produce a more uniform product, facilitating the making of adjustments, and making them more sensitive to changes or variations in the material which they are handling. It is a further object of the invention to make apparatus of this kind more completely automatic, to simplify the mechanical organization of these systems, to enable the machines in such systems to take care of themselves automatically under emergency conditions, and to reduce the skill and attention required in operating such systems under mill conditions.

The nature of the invention will be readily understood from the following description when read in connection with the accompanying drawings, and the novel features will be particularly pointed out in the appended claims.

Preliminary to a detailed description of the construction illustrated in the drawings, it may be stated that before the cotton is delivered to a system, such as that here shown, it is subjected to a series of opening and cleaning operations. Usually the bales of cotton are opened and the cotton is thrown into a bale breaker which in a typical installation is arranged to discharge into a vertical opener. From the latter machine the cotton may go into a lattice opener or horizontal cleaner and finally is conveyed pneumatically to the picker room. A single set of opening and cleaning machines will supply several pickers, and it is the usual practice, therefore, to deliver the cotton to the feed hoppers of the several picking machines by a Morton distributor. The system illustrated is arranged to receive its cotton or other fibre in this manner.

Figure 1:
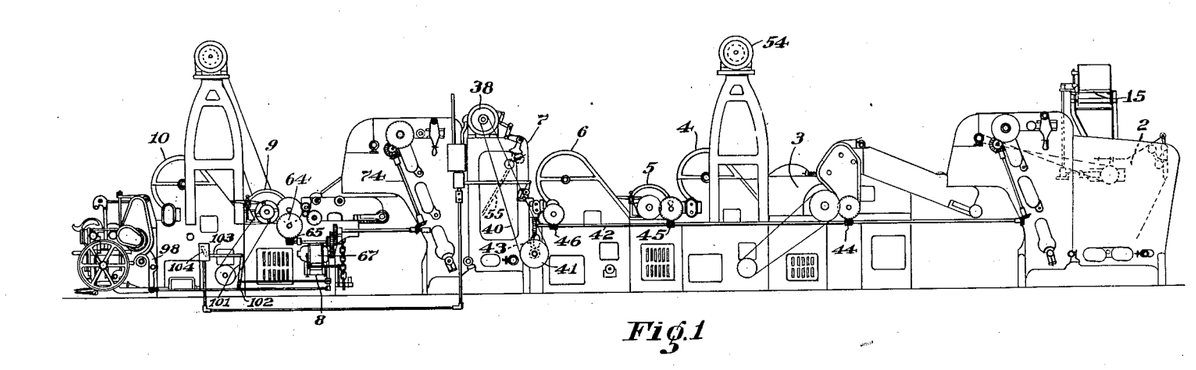
Figure 1 is a side elevation of a one-process picker system organized in accordance with this invention.
Figure 2:
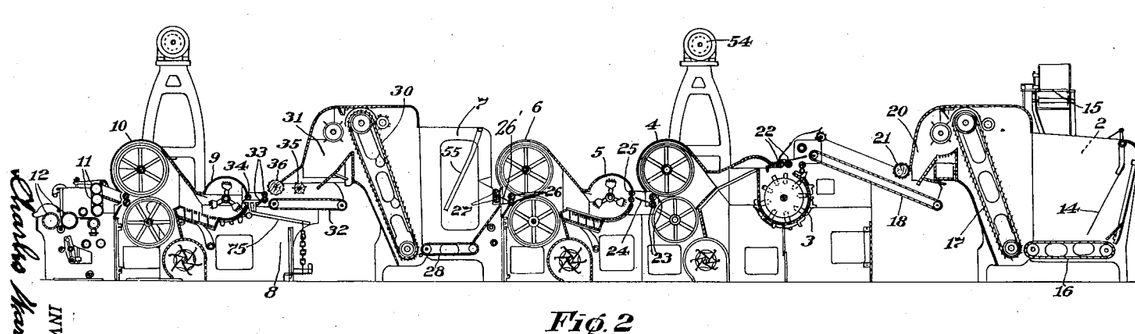
Fig. 2 is a vertical, sectional view, somewhat diagrammatic, of the system shown in Fig. 1.

Referring more particularly to Figs. 1 and 2, the supply hopper feeder 2 is arranged to receive its cotton from a Morton distributor, although the system can be supplied in other ways well known in the art. From the supply feeder 2 the cotton is fed to the beater section 3 of the first picker unit of the system, and is conveyed by air currents from this beater to the condenser section 4 of the first unit. Additional mechanism feeds the cotton from the condenser to the beater section 5 of the second picker unit, and it then passes into the condenser 6 for this unit and is fed from the condenser into an intermediate hopper feeder 7. From this hopper feeder the cotton is fed through an evener mechanism, indicated in general at 8, into the beater section 9 of the finisher lapper, this lapper including a condenser section 10, the usual calendar rolls 11 and the winding rolls 12, Fig. 2, which roll the web of cotton into the form of a lap. This general arrangement of units has been used heretofore in single process systems embodying the inventions above referred to. The units themselves may, with the exception of the evener 8, and with certain modifications hereinafter described, be like those commonly used in the present commercial systems.

As shown, the supply hopper feeder 2 is equipped with the usual feeler fork 14 and mechanism automatically controlled thereby for governing the discharge of cotton from the conveyor belt 15 into the hopper. This mechanism is well known in this art and no detailed disclosure of it, therefore, is necessary. The controlling mechanism may either be like that used in the well known Morton distributing system, or more preferably like that shown in the pending application of William Shaw Serial No. 192,910, filed May 20, 1927, and assigned to the assignee of the present invention. As usual, the arrangement is such that when the supply of cotton in the hopper 2 becomes depleted, the feeler fork will be swung forward automatically, thus causing the distributor gate to swing across the conveyor belt 15 and divert the cotton into the hopper 2. The increased weight of cotton in the hopper acts on the feeler fork to swing it back into its original position after a time, thus causing the gate to close again and stop the delivery of cotton to this particular hopper. The mechanism, therefore, tends to maintain the supply of cotton in the hopper between certain predetermined limits, although other factors tend to increase the variations in this quantity, such for example, as the fact that the distributor belt 15 usually is arranged to supply a series of machines or systems, and it may be that more than one machine will call for cotton at the same time, in which event the first machine in the series will receive its supply before any subsequent machine can be supplied.

The various feeding mechanisms for transferring the cotton from the supply hopper 2 to the intermediate hopper 7 include the usual horizontal lattice 16 in the hopper 2, Fig. 2, an inclined lattice 17 in said hopper, and a second inclined lattice 18 on to which the cotton is discharged from the hopper chute 20. A press roll 21 crowds the cotton firmly against the conveyor 18. This conveyor delivers the cotton to the feed rolls 22—22 for the beater 3. From the condenser section 4 for the first picker unit the cotton is fed between rolls 23—23 along a short upwardly inclined plate 24 to the feed rolls 25—25 for the second beater section 5. A similar arrangement is provided between the condenser 6 for the second picker unit and the intermediate hopper feeder 7, and comprises two rolls 26—26 which take the cotton from the condenser screens and feed it up a short plate 26', Fig. 2, into the bite of two additional rolls 27—27. This intermediate hopper feeder also is equipped with the usual horizontal and inclined lattices 28 and 30, respectively, the latter lattice feeding the cotton to the discharge chute 31 through which it drops on to the feed lattice 32 that delivers it to rolls 33—33 immediately in front of the evener roll 34, press rolls 35 and 36 cooperating with the lattice conveyor 32 better to control the cotton.

It has been found that if the quantity of cotton in a hopper feeder of the type shown at 2 and 7 is maintained substantially constant, the pins on the inclined feed lattice for the hopper will deliver cotton at a very constant rate, but that if the quantity of cotton in the hopper becomes depleted the rate at which its lattice discharges will be correspondingly reduced. On the other hand, if the weight of cotton in the hopper increases, the rate of discharge of cotton will be increased, notwithstanding the fact that no change has been made in the rate of movement of the lattice. As above explained, substantial variations in the quantity of cotton in the supply hopper 2 necessarily occur, and these variations result in corresponding variations in the rate at which the cotton is fed by the feeding mechanisms from the supply hopper to the intermediate hopper. The latter hopper acts as a reservoir to smooth out or reduce the variations in the flow of cotton from the supply hopper to the lapper, and in order to reduce the variations in the quantity of cotton in the intermediate hopper still further, it has been proposed heretofore to control the rate of travel of the feed lattice 17 in the supply hopper 2 automatically in accordance with variations in the quantity of cotton in the intermediate hopper feeder 7. It will be clear, however, from an inspection of Fig. 2 that if the intermediate hopper 7 is calling for cotton and such a call results in speeding up the rate of travel of the lattice 17, there will be a substantial interval of time before the results of such increased rate of discharge from the hopper feeder 2 make any change in the rate of delivery of cotton to the hopper 7. In the meantime the rate of delivery of cotton from the intermediate hopper 7 has been too low because of the inadequate supply of cotton in the hopper, thus tending to form a thin or light weight section in the lap being produced in the lapper.

The present invention deals particularly with this problem and it aims to devise a mechanism which will exert a constant and highly sensitive control over all of the feeding mechanisms between the hoppers 2 and 7, and in addition to simplify the driving mechanism for these feeding devices. The common electric motors, particularly those of the alternating current type, are not suitable for directly operating mechanisms of this kind. In fact, where such motors have been depended upon heretofore it has been usual to interpose a variable speed mechanism between the motor and feeding mechanism. I have found, however, that an alternating current motor can be obtained in which the speed is controlled by adjustment of a brush or brushes, one example of such a motor being the Type BSR motor put out by the General Electric Company. Such a motor of the so-called "repulsion" type has characteristics which make it exceptionally valuable for the present purposes. A motor of this general type is shown at 38, Figs. 1 and 3, for driving the cotton feeding units.

This motor is connected by a belt 40 to a pulley 41, and the pulley is connected through an angular driving mechanism of the type shown in Patent No. 1,397,244 to a horizontal shaft 42 which runs along side the entire series of units between the two hoppers 2 and 7. The angular driving mechanism just referred to comprises two spur gears both meshing with an intermediate spiral gear 43. The shaft 42 drives all of the feeding mechanisms just referred to.

Figure 4:
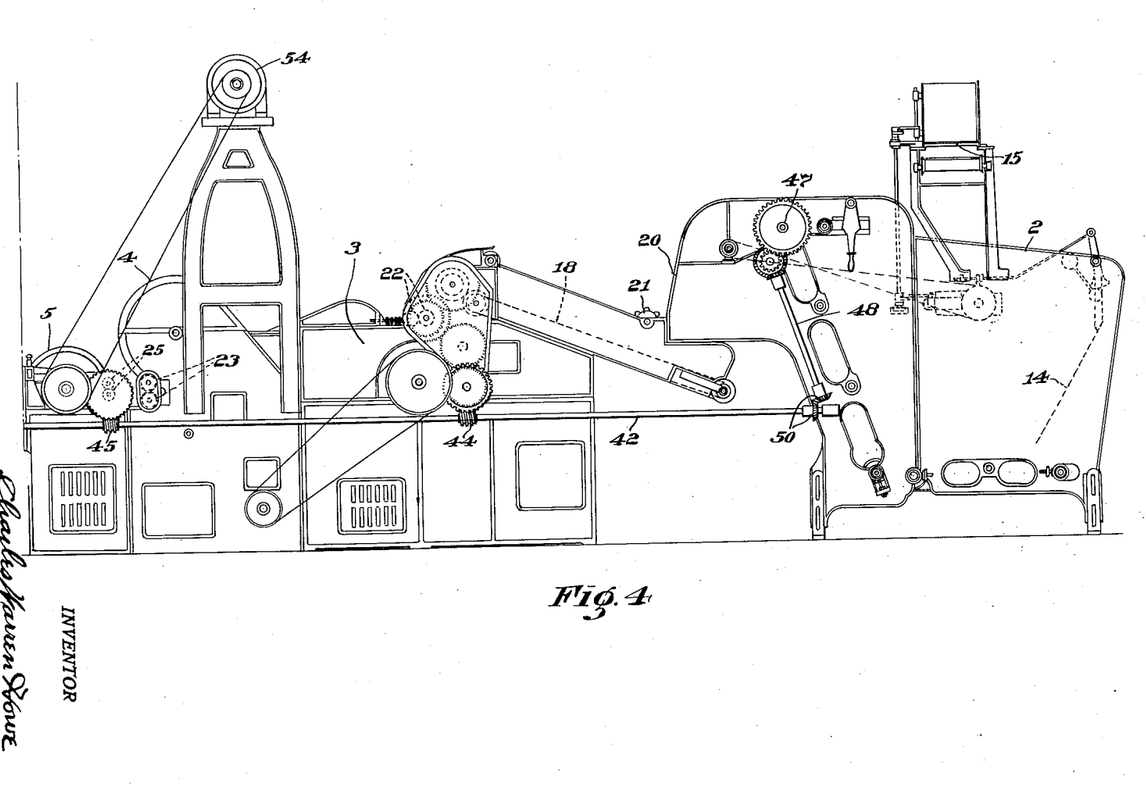

It will be clear from an inspection of Fig. 4 that the worm 44 on the shaft 42 operates through a worm wheel and reduction gearing to drive the rolls 22 that feed cotton into the beater 3. Another worm 45 on the shaft 42 operates through a similar mechanism to drive the two pairs of feed rolls 23 and 25 which feed the cotton from the first picker unit into the second picker unit. A third worm 46 drives the two pairs of rolls 26 and 27 which feed the cotton from the second picker unit into the intermediate hopper feeder 7. The screens in the screen sections 4 and 6 are driven, respectively, through connections with the feed rolls 23 and 26 associated with the screens.

Figure 6:
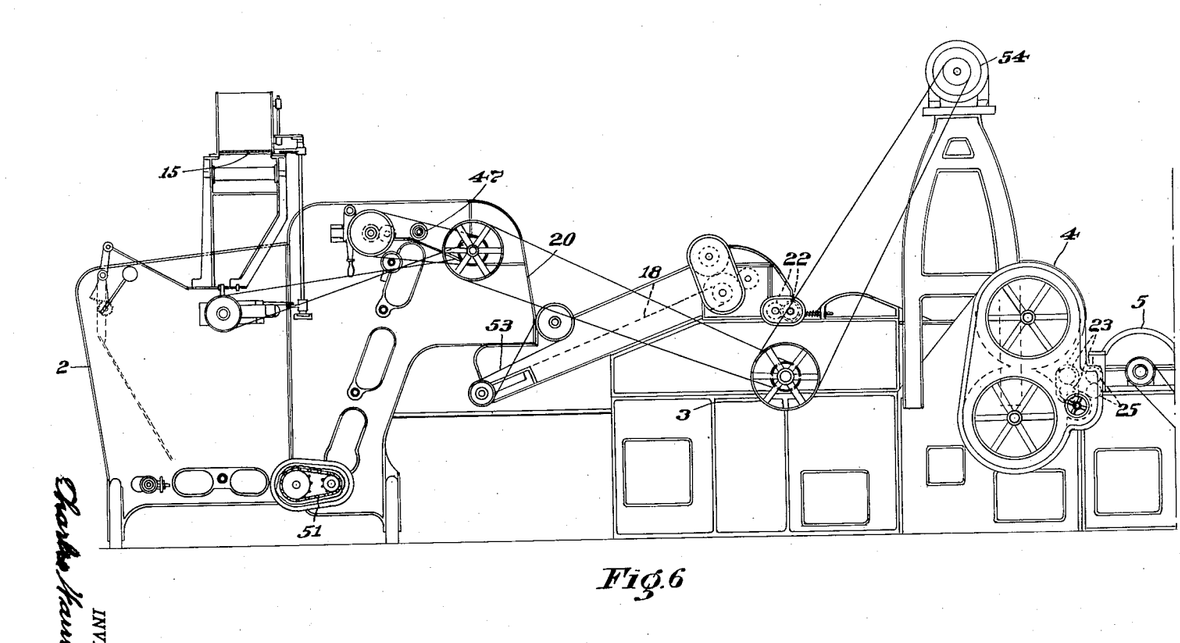

For the purpose of driving the lattices in the supply hopper 2, the driving shaft 47, Fig. 4, for the inclined lattice is connected through gearing with an inclined shaft 48 which has a bevel gear connection 50 with the driving shaft 42. These two lattices are connected together by the chain 51, Fig. 6, in the usual manner. The inclined lattice 18 is connected with the train of gearing which is operated by the worm 44, as will be clear from an inspection of Fig. 4, and the presser roll 21 is connected by a crossed belt 53, Fig. 6, with one of the rolls for supporting the lattice 18. The manner in which the other feed rolls are operated from the worms 45 and 46 will be clear from an inspection of the drawings.

It will thus be observed that all of the feeding mechanisms between the picker units and between the feed hoppers and the picker units are driven by the variable speed motor 38. Furthermore, all of these feeding devices are positively connected to each other through the driving shaft 42 and the gearing driven by said shaft so that any change in the speed of operation of the motor is transmitted instantly to all of the feeding mechanisms. The beaters 3 and 5, and the fans associated with the screens 4 and 6 are all driven in the usual manner from a motor 54, Figs. 2 and 4, and at a substantially constant speed, the driving connections for these units being shown in Figs. 4 and 6. The doffers and stripper rolls associated with the feed lattice 17 are also driven constantly from this motor 54.

Figures 3, 8:
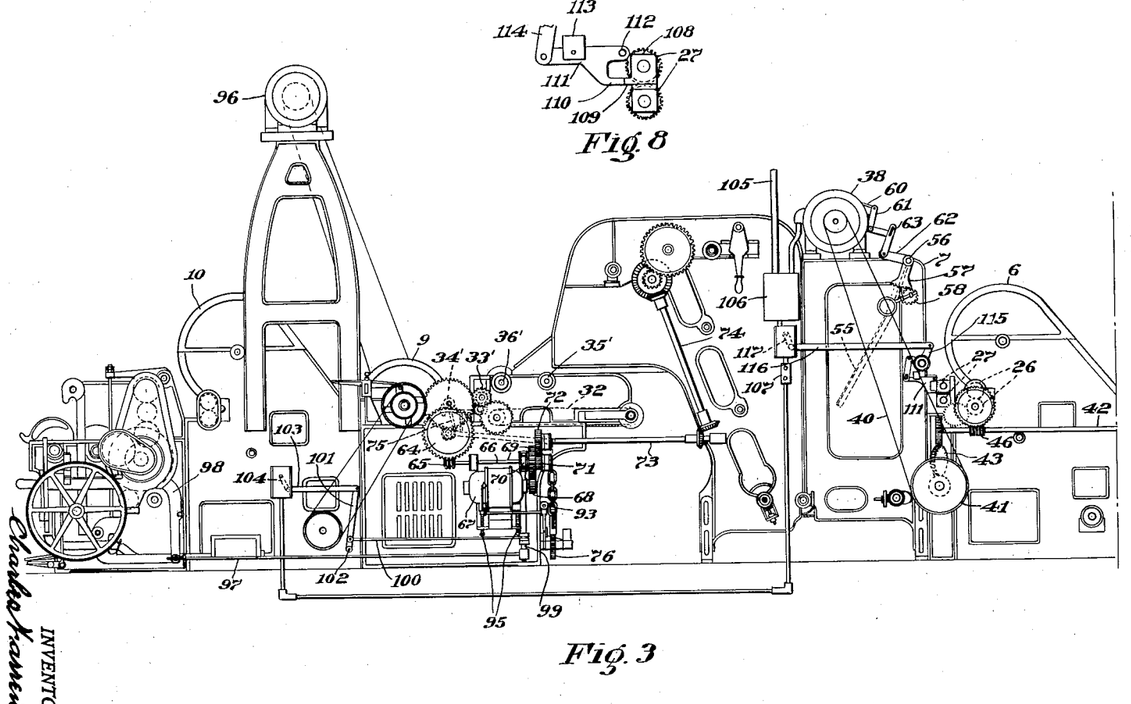
Figs. 3 and 4 are side views of sections of the system shown in Fig. 1, these two views together showing the construction which is illustrated in Fig. 1 but being on a considerably larger scale.
Fig. 8 is a detail view of certain parts of the safety mechanism shown in Fig. 3.

In order to control the rate of feed of the cotton at all feeding points between the hoppers 2 and 7 in accordance with the requirements of the latter hopper, a feeler fork 55 similar to the fork 14 is mounted in the hopper 7 to swing on the shaft 56, Fig. 3. A sector 57 on this shaft is engaged by a weighted pinion 58 which tends to swing the fork forward, this construction being like that used in the hopper 2. As above stated, the motor 38 is so designed that its speed is controlled by the adjustment of a brush or brushes, and the speed controlling element of the motor consists of an arm or lever 60, Fig. 3, which is connected with the brushes so that a movement of this arm backward or forward increases or decreases the speed of the motor. A bell crank lever 61 connects this arm with an angular arm 62 secured on the pivot or shaft 56, the connection being made by bolting one arm of the bell crank 61 through the slot in the end 63 of the angular arm 62 so that the relationship between these parts can be adjusted.

The arrangement is such that when the supply of cotton in the hopper 7 becomes slightly reduced the feeler fork 55 is swung forward and operates through the connections just described to speed up the motor 38. This, in turn, produces an immediate increase in the rate of feed of cotton at all the feeding points between the supply hopper 2 and the intermediate hopper 7. Consequently, the effect of this change in adjustment is felt instantly at the intermediate hopper. A movement of the feeler in the opposite direction slows down the operation of the feeding mechanisms.

It may here be pointed out also that in prior mechanisms of this character where a feeler has been made to control a variable speed mechanism, a double cone drive has invariably, so far as I have been able to learn, been used, the feeler being required to change the adjustment of the belt. While these mechanisms have long been used and have given very good service, it has been recognized, nevertheless, that the belt offers considerable resistance to adjustment, and that this resistance varies appreciably under different operating conditions even in the same mechanism. Such resistance obviously makes the entire assembly less sensitive to variations in the material being handled than otherwise would be the case, and variations in this resistance are accompanied by corresponding variations in sensitivity. In the present mechanism the adjustment of the speed controlling element 60 offers a resistance to movement or adjustment which is practically negligible. Consequently, by properly balancing the feeler fork 55 through the weighted pinion 58 the mechanism can be made far more sensitive than has been possible heretofore. This, combined with the fact that the entire feed of cotton from the supply hopper to the intermediate hopper is constantly under the control of the feeler 55 and can be instantly changed by the movement of the feeler, make it possible to maintain automatically a quantity of cotton in the hopper 7 far more constant than has been the case in any prior apparatus of which I have been able to learn.

As above stated, the fact that a substantially constant quantity of cotton is maintained in the intermediate hopper feeder 7 results in feeding cotton from this hopper with a high degree of uniformity. A further control of this rate of feed to the beater 9 of the finisher lapper is effected by an evener mechanism through which the cotton passes immediately prior to entering the beater. This invention also provides a novel organization of evener mechanism in which advantage preferably is taken of the variable speed characteristics of electric motors of the type above described and of the ease with which this speed can be controlled.

Figure 5:
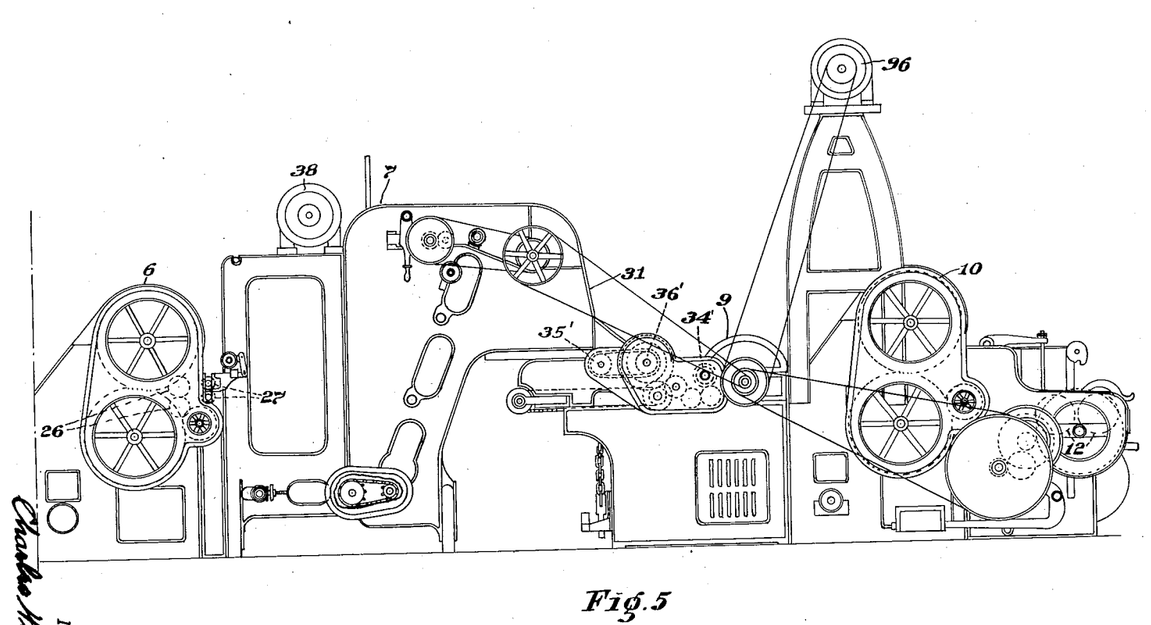
Figs. 5 and 6 are views of the opposite sides of the sections shown in Figs. 3 and 4.

Referring more particularly to Figs. 2, 3 and 5, it will be seen that the shaft 34' for the evener roll 34, Fig. 2, is connected through intermediate gearing with the worm wheel 64 driven by a worm 65 on the end of the shaft 66. Also, that the feed rolls 33 and the horizontal feed lattice 32 are geared to the same worm wheel. The shafts 35'—36' for the press rolls 35 and 36, respectively, are also positively connected to this gearing so that this entire feeding mechanism is driven by the worm 65 and shaft 66. This shaft, in turn, is driven through reduction gearing, best shown in Fig. 7, from a motor 67 which preferably is of the same type as the motor 38. Its gear connections with the shaft 66 include a pinion 68 on the motor shaft and a gear 69 loosely mounted on the shaft 66, a clutch 70, Fig. 3, being interposed between the gear 69 and the shaft 66 and serving to connect these two elements operatively to each other or to disconnect them. A pinion 71 on the shaft 66 drives a gear 72 on the end of the horizontal shaft 73, Figs. 3 and 7, which drives the feed lattices in the intermediate hopper 7 through an inclined shaft 74, these connections being like those for driving the lattices in the hopper 2.

Figure 7:
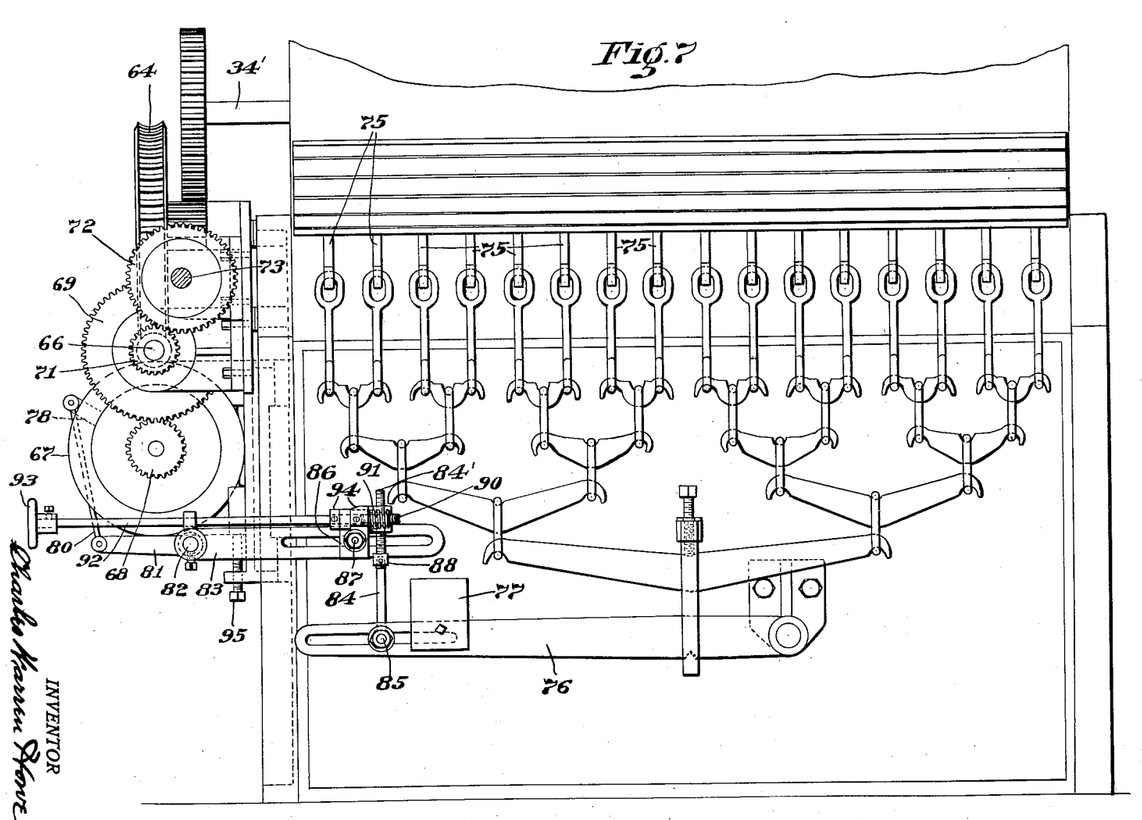
Fig. 7 is a rear elevation of the evener mechanism shown in Fig. 3.

The evener mechanism includes pedals 75, Figs. 3 and 7, of the form commonly used in mechanisms of this kind, so located with reference to the evener roll 34 that this roll feeds the cotton over the upper surfaces of the pedals and the pedals are displaced more or less by the thickness of the cotton between them and the roll. These pedals are all connected in the usual manner to a scale mechanism, as shown in Fig. 7, the mechanism including a main scale beam or lever 76 carrying an adjustable weight 77. The movement of this beam depends upon variations in the total thickness of cotton passing between the evener roll 34 and the pedals at any instant. Connections between the lever 76 and the speed controlling arm or element 78 of the motor 67 cause the pedals to adjust the motor speed in accordance with variations in the quantity of cotton passing under the roll 34. The arrangement is such that if the thickness of cotton between the roll and the pedals is too great the speed of the motor is reduced and the feeding speed of the roll 34, together with that of all the other cotton feeding elements between this roll and the hopper 7, is correspondingly reduced. On the other hand, if the cotton passing under the roll is too thin the speed of the motor 67 is increased and the other cotton feeding units are correspondingly speeded up.

The connections between the elements 76 and 78 include a link 80 connecting the arm 78 with an arm 81 fast on a rock shaft 82. Another arm 83 secured to this rock shaft is connected by a link 84 with the scale lever 76, both the arm 83 and the scale lever being slotted to permit a rough adjustment of the parts to which the link 84 is connected. The adjustment of these parts determines the operating relationship between the scale lever and the speed controlling arm 78. The link 84 includes a lower part pivoted on the bolt 85 which is adjustable longitudinally of the slot in the scale arm 76, and an upper screw threaded part 84' carried by a block 86 which is adjustable longitudinally of the arm 83 and is secured in its adjusted position by a bolt 87. These two parts 84—84' of the link are pivoted together at 88.

In order to provide for a fine adjustment of the operating relationship between the parts 76 and 78, the screw 84' is threaded axially through a worm wheel 90 arranged to be rotated by a worm 91 fast on the end of a shaft 92 which projects forward toward the side of the machine and is equipped with a hand wheel 93. Bearings carried by the arm 83 and block 86 support this shaft for rotation and collars 94, Fig. 7, cooperate with one of these bearings to prevent the shaft from moving axially. It will be clear, however, that if the shaft is rotated it will raise or lower the link 84 and thus change the operating relationship between the scale arm 76 and the motor arm 78. A very fine adjustment of this relationship therefore can be made through the parts just described.

Due to the fact that the arm 78 offers no appreciable resistance to adjustment, this mechanism is extremely sensitive. It is also less expensive to manufacture than evener mechanisms of the usual commercial type.

In some cases it may be desirable to change the gear ratio between the motor and the shaft 66 and this can readily be done by removing the pinion 68 and replacing it with a larger or smaller pinion. In order to facilitate the making of this change the motor 67 is mounted in vertical, undercut, or equivalent ways in the side of the machine frame and is supported on thrust screws 95, Figs. 3 and 7, so that the vertical position of the motor can readily be adjusted.

A motor 96, Fig. 3, running at substantially constant speed drives the lapper in the usual manner and preferably also the doffer shaft and stripper roll of the intermediate feeder 7.

When the lapper has completed the winding of a lap and automatically knocks off, it is then necessary to shut down immediately the entire feeding operations throughout the system.

This may conveniently be done by stopping the motor 38 and throwing out the clutch 70, Fig. 3. For this purpose a rod 97, Fig. 3, is connected with the drop bar 98, which is a part of the regular knock-off mechanism of the lapper, and runs to an arm secured on the lower end of an upright shaft 99. An arm projecting from the upper end of this shaft carries a fork which engages the clutch and throws it out, thus stopping all of the feeding mechanisms between the hopper 7 and the lapper. Another arm secured to this rock shaft is connected by a rod 100, Fig. 3, to a lever 101 fulcrumed at 102, and a link 103 pivoted to the upper end of the lever 101 is connected to a switch 104 in the circuit of the motor 38. Consequently, the opening of this switch by the dropping of the bar 98 stops the motor 38. The feeding mechanisms in front of the hopper 7, that is, between the hoppers 2 and 7 stop almost instantly after the current has been cut off from the motor. The lifting of the drop bar 98 to start the lapper again operates through the connections just described to close the switch 104 and to throw in the clutch 70, thus starting up all of the feeding mechanisms simultaneously with the starting of the lapper.

It is well known that the starting torque of most alternating current electric motors is very low, and it has been surprising to find that the motor 38 has sufficient torque to start up the feeding mechanisms which it drives in this system, so that any necessity for using clutches in the driving connections is avoided. This fact materially simplifies the organization.

The power supply line for the motors 38 and 67 as shown is led through the conduit 105, Fig. 3, and through a switch box 106. A hand operated switch 107 is connected in series with the switch 104 and provides a manual control for starting or stopping the motor 38.

It may happen occasionally that the cotton will tend to wind on one or both of the feed rolls 26 and build up sufficiently to plug the feeding mechanism or break the screens in the screen section 6. In order to shut down the system automatically in such an event, the upper feed roll 27 is mounted in journal boxes which are guided in vertical ways so that the upper roll can rise or fall relatively to the lower roll, the latter roll, however, revolving on a fixed axis. When a sheet of cotton of normal thickness is passing between these rolls they will be separated by a certain fixed distance, and advantage is taken of this fact in providing a safety mechanism for shutting down the system.

Referring to Fig. 8 it will be observed that the box 108 in which one end of the shaft of the upper feed roll 27 is journaled has a finger 109 projecting therefrom. This finger has a square end which normally abuts against another finger 110, the latter finger forming one arm of a bell crank lever 111 fulcrumed at 112. A weight 113 adjustably mounted on this lever tends to hold the finger 110 in contact with the finger 109. The forward end of the lever 111 has a pin and slot connection through a link 114 with another bell crank lever 115, Fig. 3, and a second link 116 connects this lever with a switch 117 which stops and starts the motor 38, the switch being equipped with a reset. Consequently, if the cotton tends to wind on either of the feed rolls 27 the upper roll will be forced away from the lower roll to an extent sufficient to move the finger 109 out of engagement with the finger 110. When this happens the lever 111 swings in a counter-clockwise direction, thus operating through the connections just described to open the switch 117 and shut down the motor 38.

Such a winding or "lapping up" of the cotton on feed rolls at some earlier point in the system may occur. When this happens it stops the feed of cotton and such interruption of the feeding operation is felt a few seconds later at the feed rolls 27—27 and results in the upper of these rolls moving toward the lower one to an abnormal degree. Such a movement causes the finger 109 to drop below the finger 110, whereupon the lever 111 again swings in a counter-clockwise direction and opens the switch 117. The system thus can take care of itself automatically in the event of the feeding mechanisms becoming plugged or the machine being "starved" for any reason, as, for example, due to a failure of the control mechanism for the Morton distributor.

It will now be appreciated that the invention provides a very much simpler organization of driving mechanism than those heretofore available. This, in turn, reduces the expense of the initial installation and makes the system more reliable. In addition, the controlling apparatus for the system is greatly simplified, one clutch only being employed in the entire drive for the feeding mechanisms, namely, the clutch 70. As above explained, a far more sensitive automatic control of the cotton feeding operations is afforded by this invention, and it has been definitely determined in practice that an exceptionally high degree of yard for yard uniformity in the laps is secured. If a mill operator finds that his laps are running too light, or if the fibre is changed so that it is necessary to change the adjustment of his system, he has only to turn the hand wheel 93 to increase or decrease the weight of his laps, as desired. Consequently, the skill which has been required in the operation of prior systems is very largely eliminated.

While I have herein shown and described a preferred embodiment of my invention, it will be understood that the invention may be embodied in a considerable variety of forms without departing from the spirit or scope thereof. For example, other sources of power may be substituted for the motor 38 to drive the side shaft 42 of the breaker section, and the feeding mechanisms associated therewith at a variable speed. It will also be clear that some of the mechanisms provided by this invention are useful in other relationships than those herein disclosed. While the system has been herein disclosed particularly with reference to the handling of cotton, it will be understood that it can also be used in feeding other fibre which can be handled in essentially the same manner as cotton and such fibres are therefore regarded as the equivalent of cotton.

Having thus described my invention, what I desire to claim as new is:

1. That improvement in processes of picking cotton and the like which consists in subjecting the cotton to a plurality of picking operations and finally working it into the form of a lap, feeding the cotton continuously from a supply through one of said operations to the next, causing the cotton to pass through a reservoir between certain of said picking operations, and constantly controlling all of said cotton feeding operations between said supply and the reservoir to vary the rate of feed in response to variations in the quantity of cotton in the reservoir.

2. That improvement in processes of picking cotton and the like which consists in subjecting the cotton to a plurality of picking operations and finally working it into the form of a lap, feeding the cotton continuously from a supply through one of said operations to the next, causing the cotton to pass through a reservoir between certain of said picking operations, and utilizing variations in the weight of cotton in said reservoir to control the rate at which the cotton is fed toward said reservoir at all of the feeding points between said reservoir and said supply.

3. That improvement in processes of picking cotton and the like which consists in passing the cotton through a plurality of picking units and finally working it into the form of a lap, feeding the cotton continuously from a supply through one of said units to the next, causing the cotton to pass through a reservoir between certain of said picking units, and utilizing variations in the quantity of cotton in said reservoir to control continuously the rate of feed of the cotton toward the reservoir at all the feeding points between said reservoir and said supply and to increase or decrease said rate of feed to the end that a substantially constant quantity of cotton shall be maintained in said reservoir.

4. In a cotton picking system, the combination of a hopper feeder, a plurality of cotton handling units through which the cotton passes on its way to said feeder, said units including a picker, feeding mechanisms between adjacent units for feeding the cotton continuously from one unit to another and from the unit immediately in front of the hopper feeder to said hopper feeder, a variable speed mechanism for driving all of said feeding mechanisms, and means for automatically adjusting said variable speed mechanism to change its speed in response to changes in the quantity of cotton in said hopper feeder.

5. In a cotton picking system, the combination of a hopper feeder, a plurality of cotton handling units through which the cotton passes on its way to said feeder, said units including a picker, feeding mechanisms between adjacent units for feeding the cotton continuously from one unit to another and from the unit immediately in front of the hopper feeder to said hopper feeder, a variable speed electric motor for driving all of said feeding mechanisms, and means for automatically controlling the speed of said motor in response to changes in the quantity of cotton in said hopper feeder.

6. In a cotton picking system, the combination of a hopper feeder, a plurality of cotton handling units through which the cotton passes on its way to said hopper feeder, said units including a picker, feed rolls between adjacent units for feeding the cotton continuously from one unit to another and from the unit immediately in front of said hopper feeder to the hopper feeder, a variable speed electric motor connected with said feeding mechanisms for driving all of them, a speed adjusting element for said motor, a feeler arranged to engage the supply of cotton in said hopper feeder and movable automatically in response to variations in the quantity of said cotton, and connections between said feeler and said element for changing the speed of said motor automatically in response to variations in said quantity of cotton.

7. In a cotton picking system, the combination of a hopper feeder, a plurality of cotton handling units through which the cotton passes on its way to said hopper feeder, said units including a picker, feed rolls between adjacent units for feeding the cotton continuously from one unit to another and from the unit immediately in front of said hopper feeder to the hopper feeder, a shaft positively connected with all of said feeding mechanisms to drive them, a variable speed mechanism for driving said shaft, and means operating through said variable speed mechanism for automatically varying the speed of said shaft in response to changes in the quantity of cotton in said hopper feeder.

8. In a cotton picking system, the combination of a hopper feeder, a plurality of cotton handling units through which the cotton passes on its way to said hopper feeder, said units including a picker, feed rolls between adjacent units for feeding the cotton continuously from one unit to another and from the unit immediately in front of said hopper feeder to the hopper feeder, a shaft positively connected with all of said feeding mechanisms to drive them, a variable speed electric motor connected with said shaft to drive the same, and means for automatically controlling the speed of said motor in response to changes in the quantity of cotton in said hopper feeder.

9. In a cotton picking system, the combination of a lapper, a hopper feeder for feeding cotton to said lapper, a plurality of cotton handling units through which the cotton passes successively on its way to said feeder, said units including a supply feeder and a picker to which cotton from said supply feeder is fed, feeding mechanisms between said units for feeding the cotton continuously from one unit to another and from the last of said units to said hopper feeder, a variable speed electric motor for driving all of said feeding mechanisms, and means for automatically controlling the speed of said motor in response to changes in the quantity of cotton in said hopper feeder.

10. In a cotton picking system, the combination of a lapper, a hopper feeder for feeding cotton to said lapper, a plurality of cotton handling units through which the cotton passes successively on its way to said feeder, said units including a supply feeder and a picker to which cotton from said supply feeder is fed, feeding mechanisms between said units for feeding the cotton continuously from one unit to another and from the last of said units to said hopper feeder, said units being arranged end to end, a driving shaft running alongside said units and connected with said feeding mechanisms to drive all of them, a variable speed electric motor, a reduction gearing through which said motor is connected with said shaft to drive the shaft, and means for automatically controlling the speed of said motor in response to changes in the quantity of cotton in said hopper feeder.

11. A cotton picking system organized in accordance with preceding claim 10, and including means for automatically stopping said motor when the lapper knocks off.

12. In a cotton picking system, the combination of a lapper equipped with a knock-off mechanism, a supply feeder, a picker between said feeder and lapper, an intermediate hopper feeder between said supply feeder and lapper, feeding mechanisms between said machines for advancing the cotton continuously from said supply feeder to said intermediate feeder, a variable speed electric motor for driving all of said feeding mechanisms, means for automatically controlling the speed of said motor in response to changes in the quantity of cotton in said intermediate hopper feeder, additional feeding means for advancing the cotton from said intermediate feed hopper to said lapper, a second electric motor for driving said additional feeding means, and means for automatically stopping both of said motors when the lapper knocks off.

13. In a system of the character described, the combination of a hopper feeder, mechanism for feeding cotton continuously to said feeder including a feed roll, a variable speed electric motor of the type in which the speed of the motor is controlled by adjusting a brush, reduction gearing connections between said roll and said motor through which the motor is adapted to drive the roll, a feeler responsive to changes in the quantity of cotton in said hopper feeder, and connections between said feeler and said brush for adjusting the brush into a great variety of positions each determined by a change in the quantity of cotton in the hopper feeder to thereby adjust the speed of the motor and said roll in response to said changes.

CHARLES WARREN HOWE.